(12) United States Patent
Chen et al.

(10) Patent No.: US 11,354,678 B2
(45) Date of Patent: Jun. 7, 2022

(54) ANTI-COUNTERFEIT VERIFICATION METHOD AND SYSTEM FOR A PAIR OF GLASSES

(71) Applicant: GUANGDONG JINGTAI TECHNOLOGY CO., LTD., Zhongshan (CN)

(72) Inventors: Xindong Chen, Zhongshan (CN); Xinchuan Chen, Zhongshan (CN)

(73) Assignee: GUANGDONG JINGTAI TECHNOLOGY CO., LTD., Zhongshan (CN)

(*) Notice: Subject to any disclaimer, the term of this patent is extended or adjusted under 35 U.S.C. 154(b) by 683 days.

(21) Appl. No.: 16/301,577

(22) PCT Filed: Jan. 16, 2018

(86) PCT No.: PCT/CN2018/072843
§ 371 (c)(1),
(2) Date: Nov. 14, 2018

(87) PCT Pub. No.: WO2019/052104
PCT Pub. Date: Mar. 21, 2019

(65) Prior Publication Data
US 2021/0232816 A1    Jul. 29, 2021

(30) Foreign Application Priority Data

Sep. 14, 2017 (CN) .......................... 201721177535.1
Sep. 14, 2017 (CN) .......................... 201721178675.0

(51) Int. Cl.
*G06Q 30/00* (2012.01)
*G02C 11/00* (2006.01)

(52) U.S. Cl.
CPC ......... *G06Q 30/0185* (2013.01); *G02C 11/10* (2013.01)

(58) Field of Classification Search
CPC ... G06Q 30/0185; G06Q 10/08; G06Q 10/087
(Continued)

(56) References Cited

U.S. PATENT DOCUMENTS

| 2007/0176744 A1* | 8/2007 | Park | G06Q 20/341 340/10.1 |
| 2008/0162167 A1* | 7/2008 | Hsiao | G06Q 10/087 705/28 |

(Continued)

FOREIGN PATENT DOCUMENTS

| CN | 101706928 A | 5/2010 |
| CN | 101980271 A | 2/2011 |

(Continued)

OTHER PUBLICATIONS

Canadian Office Action dated Nov. 10, 2020, in connection with corresponding CA Application No. 3,024,968; 5 pages.

(Continued)

*Primary Examiner* — Suezu Ellis
(74) *Attorney, Agent, or Firm* — Maier & Maier, PLLC

(57) ABSTRACT

Glasses, an anti-counterfeiting verification method for the same, a system and a terminal device are provided. The glasses include a spectacle frame, which includes a eyeglass frame, a leg, a nose pad arranged at the eyeglass frame and a decorating piece arranged at the spectacle frame, the nose pad includes a pad body and an adapter configured to connect the eyeglass frame, and the adapter is fixedly connected with the pad body; at least one of the decorating piece and the adapter is provided with an anti-counterfeit tag, and the anti-counterfeit tag carries manufacturer anti-counterfeit information and brand anti-counterfeit information

2 Claims, 6 Drawing Sheets

(58) Field of Classification Search
USPC .......................................................... 235/375
See application file for complete search history.

(56) References Cited

U.S. PATENT DOCUMENTS

| | | | |
|---|---|---|---|
| 2008/0218684 | A1 | 9/2008 | Howell et al. |
| 2010/0110368 | A1* | 5/2010 | Chaum ................. G02B 27/017 |
| | | | 351/158 |
| 2013/0169924 | A1* | 7/2013 | Lampley, Jr. .......... G02C 11/00 |
| | | | 351/158 |
| 2015/0235235 | A1 | 8/2015 | Koren |
| 2017/0345020 | A1* | 11/2017 | Maza .................. G06Q 30/0207 |
| 2019/0004338 | A1* | 1/2019 | Borsoi .................... G02C 11/10 |

FOREIGN PATENT DOCUMENTS

| | | |
|---|---|---|
| CN | 102314662 A | 1/2012 |
| CN | 205246993 U | 5/2016 |
| CN | 105929564 A | 9/2016 |
| CN | 205563001 U | 9/2016 |
| JP | 2007-011013 A | 1/2007 |
| KR | 1020150061540 A | 6/2015 |
| WO | 2016168654 A1 | 10/2016 |
| WO | 2017/108981 A1 | 6/2017 |

OTHER PUBLICATIONS

Office Action dated Jul. 23, 2018, in corresponding Chinese Application No. 201820075696.8 including partial machine-generated English language translation; 4 pages.
Office Action dated Oct. 17, 2019, in corresponding Canadian Application No. 3,024,968; 6 pages.
Office Action dated Oct. 25, 2019, in corresponding Australian Application No. 2018267551; 4 pages.
Search Report and Written Opinion dated Jun. 11, 2018 in corresponding International Application No. PCT/CN2018/072843; 9 pages.
Japanese Office Action dated Dec. 10, 2019, in connection with corresponding JP Application No. 2018-562110 (8 pgs., including machine-generated English translation).
Extended European Search Report dated Aug. 27, 2021, in connection with corresponding European Application No. 18800030.1; 10 pages.

* cited by examiner

ANTI-COUNTERFEIT VERIFICATION METHOD AND SYSTEM FOR A PAIR OF GLASSES

FIELD

The present application pertains to the technical field of anti-counterfeiting, particularly to glasses, an anti-counterfeiting verification method for the same, a system and a terminal device.

BACKGROUND

For a long time, counterfeit and shoddy goods not only seriously affect the country's economic development, but also endanger vital interests of enterprises and consumers. In order to protect the interests of enterprises and consumers, and ensure healthy development of the socialist market economy, the country and enterprises need to spend a lot of manpower and financial resources every year for anti-counterfeiting and cracking down.

However, most of the existing anti-counterfeiting technologies, still making a fuss about paper materials, have the following defects:

(1) the techniques, such as laser anti-counterfeiting, fluorescent anti-counterfeiting, magnetic anti-counterfeiting, temperature anti-counterfeiting, special plate-making or the like, are anti-counterfeiting techniques commonly used. Because they are not unique and exclusive, and are easily copied and forged, thus failing to achieve the function of real anti-counterfeiting;

(2) the anti-counterfeit tag is not beautiful and not easy to install, which is easy to change the design of the original glasses.

SUMMARY

Given this, the present application provides glasses, an anti-counterfeiting verification method for the same, a system and a terminal device, aimed at solving the problems that the existing glasses are easily copied and forged, and the anti-counterfeit tag is not easy to install and affects the design of the original glasses.

A first aspect of the embodiments of the present application provides a glasses, and the glasses includes a spectacle frame, herein the spectacle frame includes a eyeglass frame, a leg, a nose pad arranged at the eyeglass frame and a decoration piece arranged at the spectacle frame, the nose pad includes a pad body and an adapter configured to connect the eyeglass frame, and the adapter is fixedly connected with the pad body;

wherein at least one of the decoration piece and the adapter is provided with an anti-counterfeit tag, the anti-counterfeit tag carries manufacturer anti-counterfeit information and brand anti-counterfeit information;

when the decoration piece is provided with the anti-counterfeit tag, the size, shape and appearance of the anti-counterfeit tag are totally same with the size, shape and appearance of the position where the anti-counterfeit tag is arranged; and when the adapter is provided with the anti-counterfeit tag, the anti-counterfeit tag is arranged inside the adapter;

herein the length and width of the anti-counterfeit tag range from 0.1 mm to 15 mm, and the cross-sectional area of the anti-counterfeit tag ranges from 0.01 $mm^2$ to 225 $mm^2$.

In an embodiment, the adapter includes a supporting handle and a supporting seat fixed on the upper end of the supporting handle, and the supporting seat is fixedly connected to the pad body;

when the adapter is provided with the anti-counterfeit tag, a mounting groove is provided on the upper end of the supporting seat, and the anti-counterfeit tag is arranged in the mounting groove.

In an embodiment, the decoration piece is arranged at the eyeglass frame or the leg;

the leg includes a front end of the leg and a rear end of the leg, and the eyeglass frame is pivotally connected to the front end of the leg;

when the decoration piece is arranged at the eyeglass frame, the decoration piece is arranged at the front end of the leg;

when the decoration piece is arranged at the leg, a mounting part is arranged at the front end of the leg, and the decoration piece is arranged at the mounting part; and when the decoration piece is provided with the anti-counterfeit tag, a mounting groove is provided on the upper end of the supporting seat, and the anti-counterfeit tag is arranged in the mounting groove.

In an embodiment, a cover plate is arranged at the notch of the mounting groove, and the cover plate is seamlessly engaged with the notch in a detachable manner.

In an embodiment, a glue layer and/or wave absorbing material is arranged between the mounting groove and the anti-counterfeit tag.

In an embodiment, the decoration piece is an identifier, and the anti-counterfeit tag is a RFID tag or a NFC tag.

A second aspect of the present application provides an anti-counterfeit verification method, implemented based on the above glasses, and the method includes:

acquiring authentication information input by a user;

sending the authentication information to a manufacturer server or a dealer server for verification;

acquiring manufacturer anti-counterfeit information and brand anti-counterfeit information carried by at least one anti-counterfeit tag when a message that the authentication information is validated is received, herein the at least one anti-counterfeit tag is arranged at the glasses;

sending the manufacturer anti-counterfeit information and the brand anti-counterfeit information to the manufacturer server for verification; herein, the manufacturer server is configured to send the brand anti-counterfeit information to the dealer server for verification when the manufacturer anti-counterfeit information is validated;

determining the glasses to be a genuine one when a message that the manufacturer anti-counterfeit information is validated and a message that the brand anti-counterfeit information is validated are received;

determining the glasses to be a branded product when only the message that the manufacturer anti-counterfeit information is validated is received; and determining the glasses to be a counterfeit when the message that the manufacturer anti-counterfeit information is validated is not received.

A third aspect of embodiments of the present application provides an anti-counterfeit verification system, implemented based on the above glasses, and the system includes:

the authentication information acquisition module is configured to acquire authentication information input by a user;

the first communication module is configured to send the authentication information to a manufacturer server or a dealer server for verification;

the anti-counterfeit information acquisition module is configured to acquire manufacturer anti-counterfeit information and brand anti-counterfeit information carried by at least one anti-counterfeit tag when a message that the authentication information is validated is received, herein the at least one anti-counterfeit tag is arranged at the glasses;

the second communication module is configured to send the manufacturer anti-counterfeit information and the brand anti-counterfeit information to the manufacturer server for verification; herein, the manufacturer server is configured to send the brand anti-counterfeit information to the dealer server for verification when the manufacturer anti-counterfeit information is validated;

the first determination module is configured to determine the glasses to be a genuine one when a message that the manufacturer anti-counterfeit information is validated and a message that the brand anti-counterfeit information is validated are received;

the second determination module is configured to determine the glasses to be a branded product when only the message that the manufacturer anti-counterfeit information is validated is received; and a third determination module, configured to determine the glasses to be a counterfeit when the message that the manufacturer anti-counterfeit information is validated is not received.

A fourth aspect of embodiments of the present application provides a terminal device, and the terminal device includes a memory, a processor, and computer programs stored in the memory and capable of being executed by the processor, and the processor, when executing the computer programs, implements the steps of the above method.

A fifth aspect of embodiments of the present application provides a computer readable storage medium, which is stored with computer programs, and the computer programs, when executed by a processor, implement the steps of the above method.

In the embodiments of the present application, through arranging the anti-counterfeit tag at the decoration piece of the spectacle frame or the adapter of the nose pad of the glasses, the concealed anti-counterfeiting of the glasses can be realized, so that the lawbreakers are difficult to find and counterfeit the anti-counterfeit tag, and the anti-counterfeit tag is easy to install without affecting the original design of the glasses meantime.

BRIEF DESCRIPTION OF THE DRAWINGS

In order to more clearly illustrate the technical solutions in the embodiments of the present application, the drawings used in the description of the embodiments or the prior art will be briefly described below. Obviously, the drawings in the following description are only some embodiments of the present application, and other drawings may be obtained based on these drawings for those skilled in the art without creative work.

DETAILED DESCRIPTION

In the following description, specific details, such as specific system structures, techniques and the like, are presented for illustration and not for limitation, so as to have a thorough understanding of the embodiments of the present application. However, it will be apparent to those skilled in the art that the present application may be implemented in other embodiments without these specific details. In other instances, detailed descriptions for well-known systems, devices, circuits and methods are omitted, such that the description of the present application is not obscured by unnecessary details.

In order to explain the technical solutions described in the present application, the following description will be made by way of specific embodiments.

Figure 1:
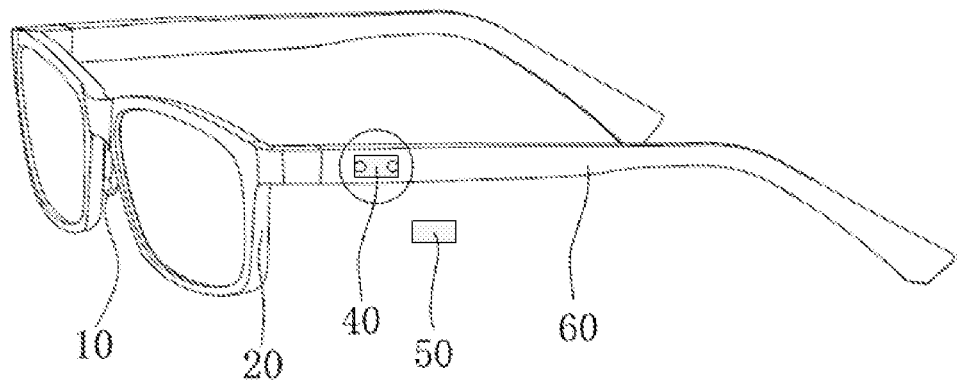
FIG. 1 is a schematic view of a solid structure of the glasses provided in an embodiment of the present application.
Figure 2:
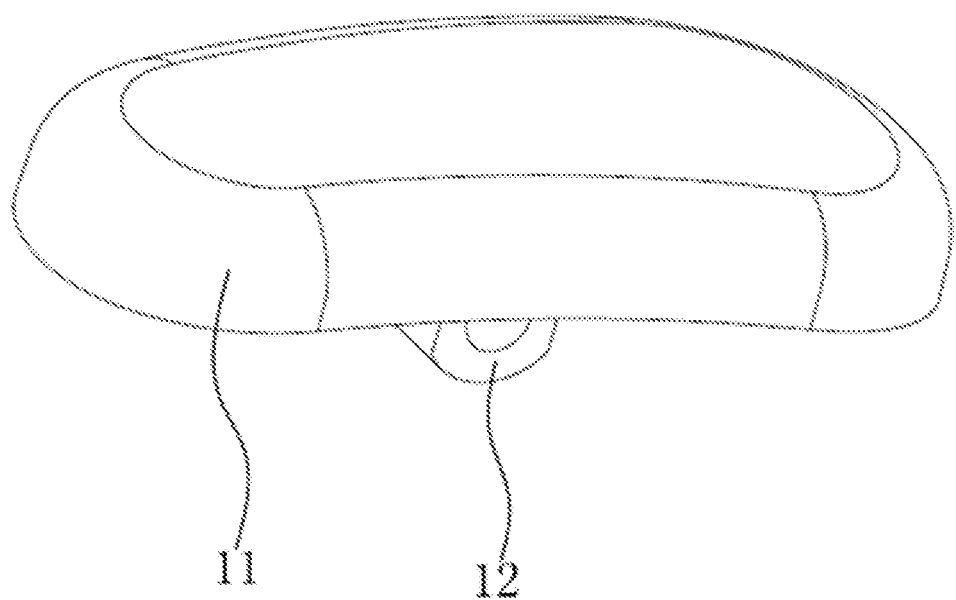
FIG. 2 is a schematic view of a solid structure of the nose pad provided in an embodiment of the present application.

As shown in FIG. 1 and FIG. 2, the present embodiment provides a glasses, which includes a spectacle frame, the spectacle frame includes a eyeglass frame 20, a leg 60, a nose pad 10 arranged at the eyeglass frame 20 and a decoration piece 50 arranged at the spectacle frame, the nose pad 10 includes a pad body 11 and an adapter 12 configured to connect the eyeglass frame 20, and the adapter 12 is fixedly connected with the pad body 11.

In the present embodiment, at least one of the decoration piece and the adapter is provided with an anti-counterfeit tag, the decoration piece and the adapter may be both provided with an anti-counterfeit tag so as to achieve double security for the glasses and improve anti-counterfeit performance, or the anti-counterfeit tag may be only provided at any one of the decoration piece and the adapter.

In the present embodiment, the anti-counterfeit tag carries manufacturer anti-counterfeit information and brand anti-counterfeit information. Herein, the manufacturer anti-counterfeit information carries encrypted manufacturer information configured to verify the authenticity of the manufacturer; the brand anti-counterfeit information carries encrypted brand dealer information configured to verify the authenticity of the brand dealer.

In specific applications, the information carried by the anti-counterfeit tag is encrypted in a manner of symmetrical encryption or MD5 encryption.

In specific applications, the anti-counterfeit tag may be recognized through devices with tag recognition function such as a telephone, a tablet computer, a smart bracelet or a special tag reader or the like, the tag recognition device may scan the anti-counterfeit tag by emitting electromagnetic wave, and acquire the information carried by the anti-counterfeit tag through receiving the electromagnetic wave emitted or sent by the anti-counterfeit tag. The anti-counterfeit tag may be an active tag, a passive tag, or a semi-active and semi-passive tag.

In an embodiment, the anti-counterfeit tag is a RFID tag or a NFC tag, an encrypted two-dimensional code or any type of encrypted tag. The RFID tag or NFC tag actively emits a signal with certain frequency via the energy acquired from the induced current, so as to feed the information on the glasses to back to the label recognition device.

In an embodiment, the anti-counterfeit tag is arranged at the decoration piece, the anti-counterfeit tag may be arranged at a local position or all position of the decoration piece, and the size, shape and appearance of the anti-counterfeit tag are totally same with the size, shape and appearance of the position where the anti-counterfeit tag is arranged. Through making the size, shape and appearance of the anti-counterfeit tag be totally same with the size, shape and appearance of the position where the anti-counterfeit tag is arranged, the concealment of the anti-counterfeit tag may be improved, and the original design appearance of the glasses is reserved also, which will not make any difference to the original design appearance of the glasses.

In an embodiment, the decoration piece is an identifier.

In specific applications, the identifier may be a brand identity or a trade mark of the dealer, for example, the logo of the brand.

In an embodiment, the decoration piece is arranged at the eyeglass frame or the leg.

In an embodiment, the anti-counterfeit tag is arranged at the adapter.

In specific applications, the anti-counterfeit tag is arranged inside the adapter, and the adapter may be specifically made of non-transparent material. Since the anti-counterfeit tag is arranged inside the adapter, the concealment of the anti-counterfeit tag may be improved, and the original design appearance of the glasses is reserved also, which will not make any difference to the original design appearance of the glasses.

In the present embodiment, the length and width of the anti-counterfeit tag range from 0.1 mm to 15 mm, and the cross-sectional area of the anti-counterfeit tag ranges from 0.01 $mm^2$ to 225 $mm^2$.

In an embodiment, the length and width of the anti-counterfeit tag range from 0.1 mm to 6 mm, the thickness of the anti-counterfeit tag ranges from 0.1 mm to 1.5 mm, and the cross-sectional area of the anti-counterfeit tag ranges from 0.01 $mm^2$ to 0.6 $mm^2$. Through limiting the size of the anti-counterfeit tag to a miniature size, the anti-counterfeit tag may be easily installed at any position of the spectacle frame, and the glasses may acquire its original design appearance without interference, thereby ensuring the beauty of the glasses.

In an embodiment, the length and width of the tag both range from 0.1 mm to 3 mm.

Through arranging the anti-counterfeit tag at the decoration piece of the spectacle frame or the adapter of the nose pad of the glasses, the concealed anti-counterfeiting of the glasses can be realized, so that the lawbreakers are difficult to find and counterfeit the anti-counterfeit tag, and the anti-counterfeit tag is easy to install without affecting the original design of the glasses meantime.

Figure 3:
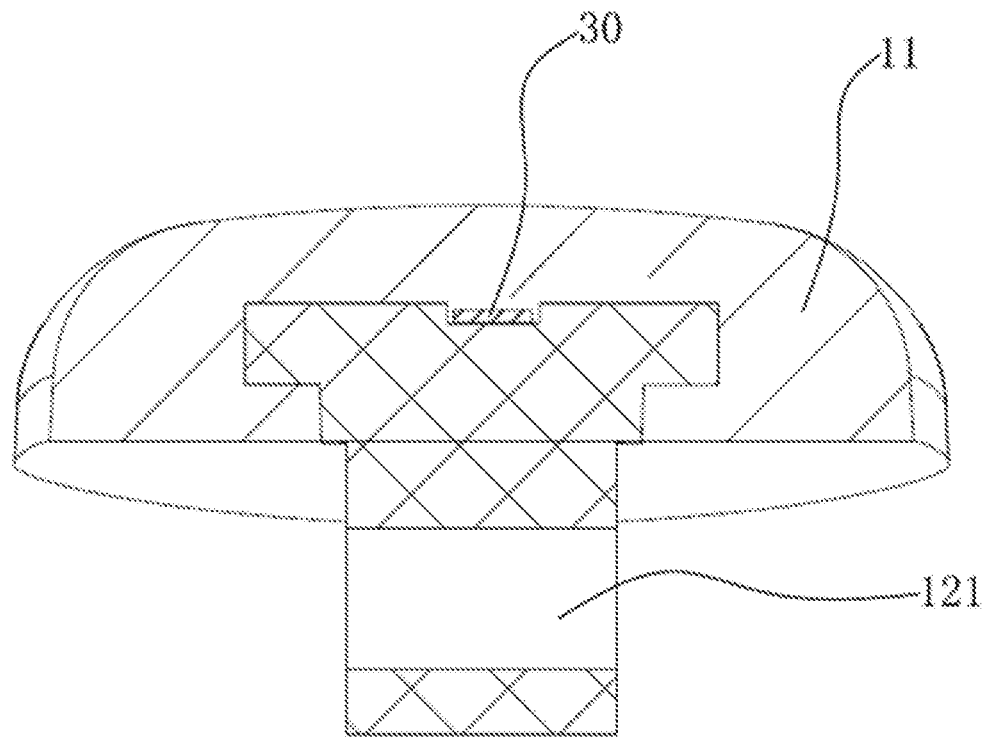
FIG. 3 is a cutaway view of the nose pad provided in an embodiment of the present application.
Figure 4:
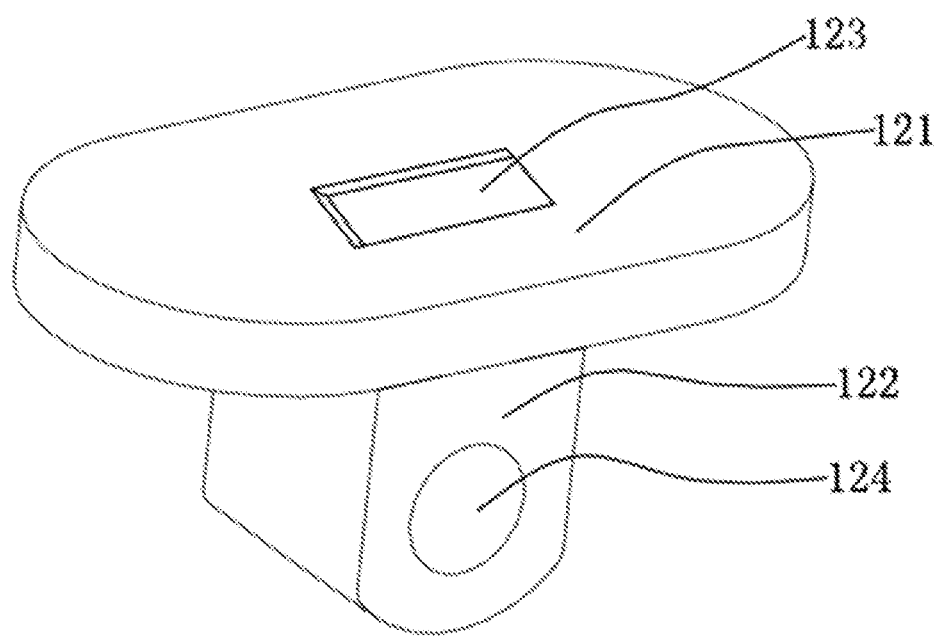
FIG. 4 is a partial exploded structural schematic view of the nose pad provided in an embodiment of the present application.

As shown in FIG. 3 and FIG. 4, in the present embodiment, the adapter 12 includes a supporting handle 122 and a supporting seat 121 fixed on the upper end of the supporting handle 122, the supporting seat 121 is fixedly connected to the pad body 11;

A mounting groove 123 is provided on the upper end of the supporting seat 121, and the anti-counterfeit tag 30 is arranged in the mounting groove 123.

In specific applications, the supporting seat is embedded in the pad body, to make the adapter and the pad body fixedly connected.

In an embodiment, there is a glue layer arranged between the mounting groove and the anti-counterfeit tag, and the glue layer firmly sticks the anti-counterfeit tag into the mounting groove.

In an embodiment, there is wave absorbing material arranged between the mounting groove and the anti-counterfeit tag, and the wave absorbing material may efficiently avoid the electromagnetic interference between the anti-counterfeit tag recognition device and the anti-counterfeit tag when the mounting groove is a metal piece.

In an embodiment, the wave absorbing material is polyurethane wave absorbing material (BPUFA), non-woven wave absorbing material (BPHPB) or ferrite wave absorbing material.

In an embodiment, a cover plate is arranged at the notch of the mounting groove, and the cover plate is seamlessly engaged with the notch in a detachable manner. Through arranging the cover plate, it is possible to prevent the anti-counterfeit tag from scratch, and prolong the service time of the anti-counterfeit tag.

As shown in FIG. 4, in the present embodiment, a through hole 124 is arranged on the supporting handle 122, a bracket (not shown) is arranged on the eyeglass frame 20, and the bracket (not shown) is connected to the through hole 124.

In an embodiment, the nose pad is pivotally connected to the bracket, and the structure of the through hole and the bracket enables the nose pad to rotate properly on the eyeglass frame and not easy to fall down, which is convenient for users to wear.

In specific applications, after the bracket is connected to the through hole, the through hole may connect a screw to fix the bracket and the supporting handle, so as to prevent the supporting handle falling down from the bracket. The supporting handle is fixedly connected to the pad body, which makes the nose pad be fixedly connected with the eyeglass frame and uneasy to fall down.

Figure 5:
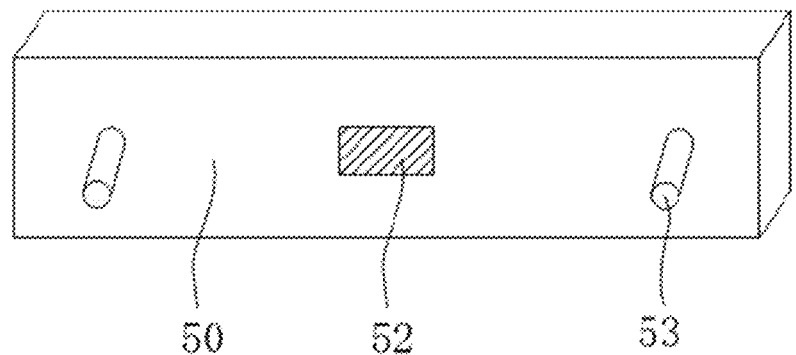
FIG. 5 is a structural schematic view of the decoration piece provided in an embodiment of the present application.
Figure 7:
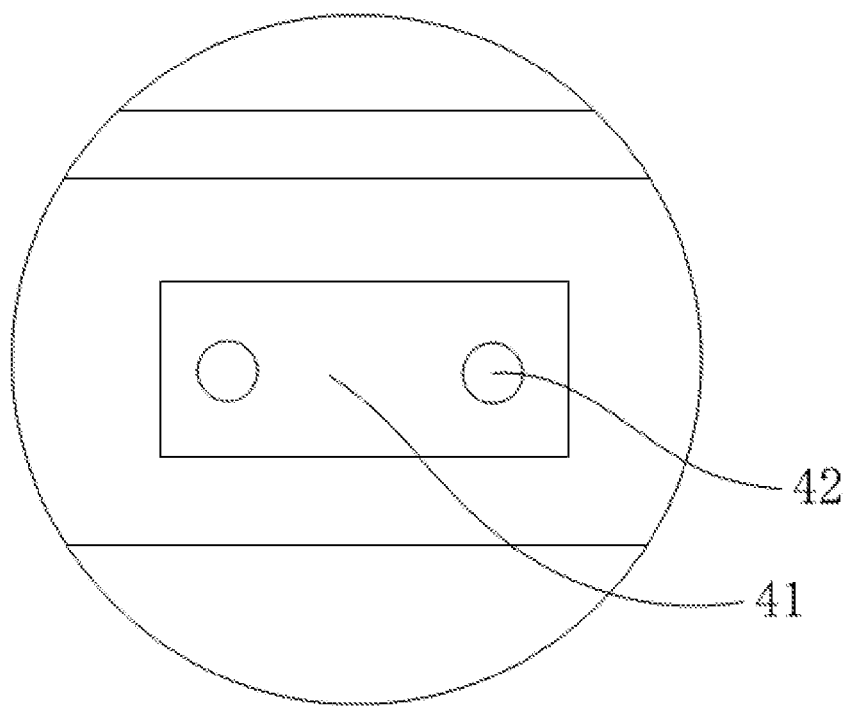
FIG. 7 is an enlarged structural schematic view at 40 in FIG. 1.

As shown in FIG. 1, FIG. 5 or FIG. 7, the leg 60 includes a front end of the leg and a rear end of the leg, the eyeglass frame 20 is pivotally connected to the front end of the leg 60. The decoration piece 50 is arranged at the front end of the leg 60, a mounting part 41 is arranged at the front end of the leg 60, and the decoration piece 50 is arranged at the mounting part 41. When the anti-counterfeit tag 52 is arranged at the decoration piece 50, the decoration piece 50 is provided with a mounting groove 54, and the anti-counterfeit tag 52 is arranged at the mounting groove 54.

Figure 6:
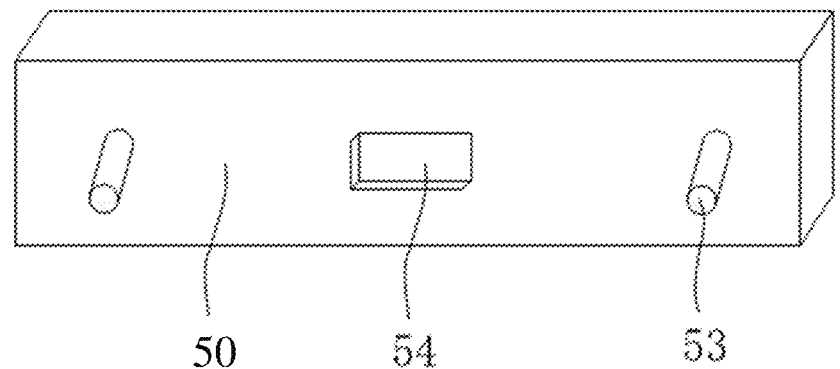
FIG. 6 is a structural schematic view of the decoration piece provided in an embodiment of the present application when the anti-counterfeit tag is removed.

As shown in FIG. 5, FIG. 6 or FIG. 7, in the present application, the decoration piece 50 is further provided with a guide post 53, the guide post 53 is fixedly connected to the spectacle frame, and the mounting part 41 is provided with a mounting hole 42, the guide post 53 is fixedly connected to the mounting hole 42, this structure makes the connection between the decoration piece 50 and the leg 60 more stable; moreover, the guide post 53 is provided with a corrugated rib, which may fix the guide post 53 to the mounting hole 42 more stably.

In an embodiment, there is a glue layer arranged between the mounting groove and the anti-counterfeit tag, and the glue layer firmly sticks the anti-counterfeit tag into the mounting groove.

In an embodiment, there is wave absorbing material arranged between the mounting groove and the anti-counterfeit tag, and the wave absorbing material may efficiently avoid the electromagnetic interference between the anti-counterfeit tag recognition device and the anti-counterfeit tag when the mounting groove is a metal piece.

In an embodiment, the wave absorbing material is polyurethane wave absorbing material (BPUFA), non-woven wave absorbing material (BPHPB) or ferrite wave absorbing material.

In an embodiment, a cover plate is arranged at the notch of the mounting groove, and the cover plate is seamlessly engaged with the notch in a detachable manner. Through arranging the cover plate, it is possible to prevent the anti-counterfeit tag from scratch, and prolong the service time of the anti-counterfeit tag.

Figure 9:
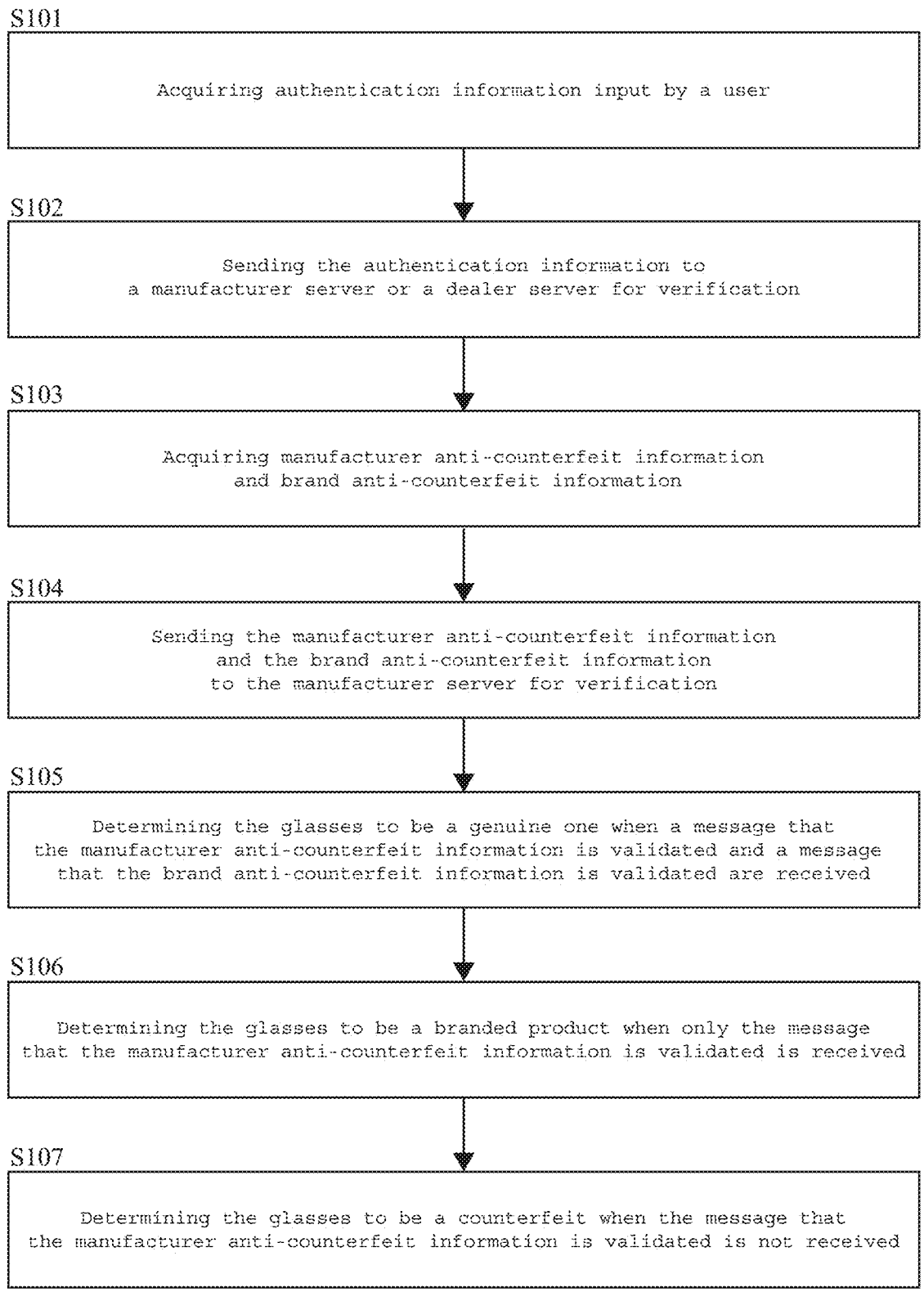
FIG. 9 is a diagram view of an anti-counterfeiting verification method.

The present embodiment provides an anti-counterfeiting verification method implemented based on the glasses in any one of the above embodiments, the method may be specifically applied to any tag recognition device with tag recognition and communication function, and, as shown in FIG. 9, the method includes:

Step S101: acquiring authentication information input by a user.

In specific applications, the user may input the authentication information on the tag recognition device through any feasible human-computer interaction, and the authentication information includes information such as a user name and password and the like.

Step S102: sending the authentication information to a manufacturer server or a dealer server for verification.

In specific applications, the manufacturer server or the dealer server may be a cloud server, or may be implemented through a PC (personal computer) client.

Step S103: acquiring manufacturer anti-counterfeit information and brand anti-counterfeit information carried by at least one anti-counterfeit tag when a message that the authentication information is validated is received, herein the at least one anti-counterfeit tag is arranged at the glasses.

In specific applications, one or more anti-counterfeit tags may be arranged on the glasses. When a plurality of anti-counterfeit tags are provided, each of the plurality of anti-counterfeit tags needs to be verified.

Step S104: sending the manufacturer anti-counterfeit information and the brand anti-counterfeit information to the manufacturer server for verification; herein, the manufacturer server is configured to send the brand anti-counterfeit information to the dealer server for verification when the manufacturer anti-counterfeit information is validated.

In specific applications, the manufacturer server first verifies the manufacturer anti-counterfeit information, after the verification is validated, the brand anti-counterfeit information is then verified by the dealer server. If the manufacturer anti-counterfeit information is not passed by the manufacturer server, there is no need to verify the brand anti-counterfeit information by the dealer server, thus the verification speed can be increased.

Step S105, determining the glasses to be a genuine one when a message that the manufacturer anti-counterfeit information is validated and a message that the brand anti-counterfeit information is validated are received; Step S106, determining the glasses to be a branded product when only the message that the manufacturer anti-counterfeit information is validated is received;

Step S107, determining the glasses to be a counterfeit when the message that the manufacturer anti-counterfeit information is validated is not received.

In specific applications, if the message that the manufacturer anti-counterfeit information is validated and the message that the brand anti-counterfeit information is validated are both received, or if merely the message that the brand anti-counterfeit information is validated is received, the glasses can be determined to be genuine; if merely the message that the manufacturer anti-counterfeit information is validated is received, i.e., it can be determined that the brand anti-counterfeit information is not validated, and the glasses is a branded product.

In specific applications, the manufacturer server is prestored with the manufacturer anti-counterfeit information on all the genuine glasses, and the dealer server is prestored with the brand anti-counterfeit information on all the genuine glasses.

It should be understood that, the sequences of the steps in the above embodiments are not intended to limit the order of execution, and the order of execution of each process should be determined by its function and internal logic, and should not be construed as limiting the implementation process of the embodiments of the present application.

Figure 10:
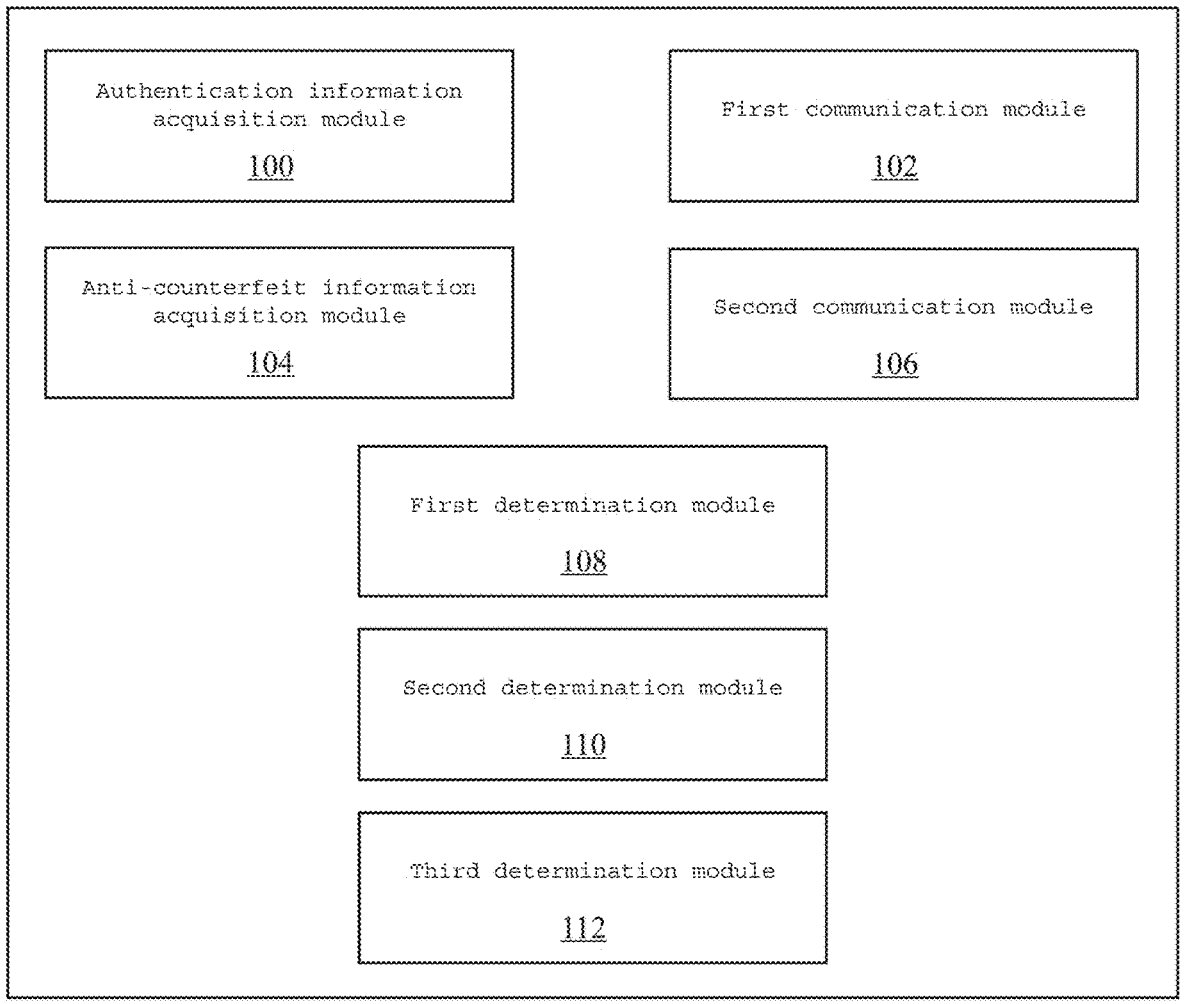
FIG. 10 is a structural schematic view of an anti-counterfeiting verification system.

The present embodiment provides an anti-counterfeiting verification system configured to implement the steps of the above method, the system may be any software system in a tag recognition device with tag recognition and communication function, and, as shown in FIG. 10, the system includes:

an authentication information acquisition module 100, configured to acquire authentication information input by a user;

a first communication module 102, configured to send the authentication information to a manufacturer server or a dealer server for verification;

an anti-counterfeit information acquisition module 104, configured to acquire manufacturer anti-counterfeit information and brand anti-counterfeit information carried by at least one anti-counterfeit tag when a message that the authentication information is validated is received, herein the at least one anti-counterfeit tag is arranged at the glasses;

a second communication module 106, configured to send the manufacturer anti-counterfeit information and the brand anti-counterfeit information to the manufacturer server for verification; herein, the manufacturer server is configured to send the brand anti-counterfeit information to the dealer server for verification when the manufacturer anti-counterfeit information is validated;

a first determination module 108, configured to determine the glasses to be a genuine one when a message that the manufacturer anti-counterfeit information is validated and a message that the brand anti-counterfeit information is validated are received;

a second determination module 110, configured to determine the glasses to be a branded product when only the message that the manufacturer anti-counterfeit information is validated is received; and a third determination module 112, configured to determine the glasses to be a counterfeit when the message that the manufacturer anti-counterfeit information is validated is not received.

Figure 8:
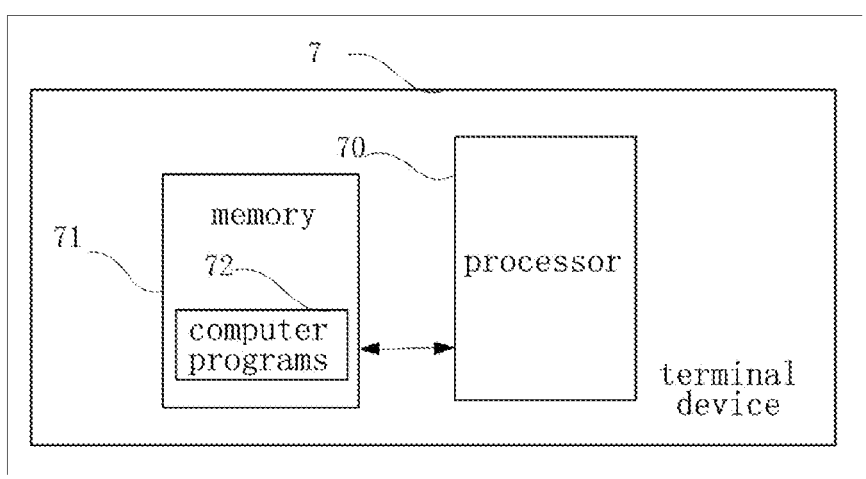
FIG. 8 is a structural schematic view of the terminal device provided in an embodiment of the present application.

FIG. 8 is a schematic view of the terminal device provided in an embodiment of the present application. As shown in FIG. 8, the terminal device 7 in the present embodiment includes: a processor 70, a memory 71, and computer programs 72 stored in the memory 71 and capable of being executed in the processor 70, such as anti-counterfeiting verification programs. The processor 70, when executing the computer programs 72, implements the steps of the anti-counterfeiting verification method in above embodiments, for example, the steps S101 to S107 in the above embodiment. Alternatively, the processor 70, when executing the computer programs 72, implements the various modules/ units of the various devices in above embodiments, for example, the various modules in the above embodiment.

As an example, the computer programs 72 may be divided into one or more modules/units, the one or more modules/units are stored in the memory 71 and executed by the processor 70, so as to implement the present application. The one or more modules/units are a series of computer program instruction sections capable of implementing specific function, the instruction sections are configured to describe the process of the computer programs 72 being executed in the terminal device 7. For example, the computer programs 72 may be divided into an authentication information acquisition module, a first communication module, an anti-counterfeit information acquisition module, a second communication module, a first determination module, a second determination module and a third determination module, the function of each of the modules is as follows:

the authentication information acquisition module is configured to acquire authentication information input by a user;

the first communication module is configured to send the authentication information to a manufacturer server or a dealer server for verification;

the anti-counterfeit information acquisition module is configured to acquire manufacturer anti-counterfeit information and brand anti-counterfeit information carried by at least one anti-counterfeit tag when a message that the authentication information is validated is received, herein the at least one anti-counterfeit tag is arranged at the glasses;

the second communication module is configured to send the manufacturer anti-counterfeit information and the brand anti-counterfeit information to the manufacturer server for verification; herein, the manufacturer server is configured to send the brand anti-counterfeit information to the dealer server for verification when the manufacturer anti-counterfeit information is validated;

the first determination module is configured to determine the glasses to be a genuine one when a message that the manufacturer anti-counterfeit information is validated and a message that the brand anti-counterfeit information is validated are received;

the second determination module is configured to determine the glasses to be a branded product when only the message that the manufacturer anti-counterfeit information is validated is received; and the third determination module is configured to determine the glasses to be a counterfeit when a message that the manufacturer anti-counterfeit information is validated or a message that the brand anti-counterfeit information is validated is received.

The terminal device 7 may be a computing device such as a desktop computer, a notebook, a palmtop computer, and a cloud server and the like. The terminal device may include, but is not limited to, the processor 70 and the memory 71. It should be understood by those skilled in the art that FIG. 8 is only an example of the terminal device 7, and does not constitute a limitation to the terminal device 7, which may include more or less components than those illustrated, or combine some components, or include different components. For example, the terminal device may further include an input/output device, a network access device, a bus, and the like.

The processor 70 may be a central processing unit (CPU), or may be other general-purpose processor, a digital signal processor (DSP), an application specific integrated circuit (ASIC), field-programmable gate array (FPGA), or other programmable logic device, discrete gate or transistor logic device, discrete hardware components, etc. The general purpose processor may be a microprocessor or the processor may be any conventional processor or the like.

The memory 71 may be an internal storage unit of the terminal device 7, such as a hard disk or a memory of the terminal device 7. The memory 71 may also be an external storage device of the terminal device 7, for example, a plug-in hard disk, a smart media card (SMC), a secure digital (SD) card or a flash card, etc., which is equipped on the terminal device 7. Further, the memory 71 may also include both an internal storage unit and an external storage device of the terminal device 7. The memory 71 is configured to store the computer programs and other programs and data required by the terminal device. The memory 71 may also be configured to temporarily store the data that has been output or is about to be output.

It will be apparent to those skilled in the art that, for convenience and brevity of description, only the division of each functional unit and module described above is exemplified. In practical applications, the above functions may be assigned to, and achieved by different functional units according to needs, i.e., the internal structure of the device is divided into different functional units or modules to perform all or part of the functions described above. Each functional unit and module in the embodiment may be integrated into one processing unit, or each unit may exist physically separately, or two or more units may be integrated into one unit. The integrated unit may be implemented by hardware, or may be implemented in the form of software functional units. Additionally, the specific names of the functional units and modules are only for the purpose of distinguishing from each other, and are not intended to limit the scope of the present application. For the specific working process of the unit and the module in the foregoing system, reference may be made to the corresponding process in the foregoing embodiments for method, and details are not described herein again.

In the above embodiments, the descriptions of the various embodiments are different focused, and the parts that are not detailed or described in a certain embodiment can be referred to the related descriptions of other embodiments.

Those skilled in the art will appreciate that, the units and the steps of the algorithms of the various examples described in connection with the embodiments disclosed herein can be implemented in the form of electronic hardware or combination of computer software and electronic hardware. Whether these functions are performed in the form of hardware or software depends on the specific application and design constraints of the technical solutions. Persons skilled in the art may use different methods for implementing the described functions for each particular application, but such implementation should not be considered to be beyond the scope of the present application.

In the embodiments provided by the present application, it should be understood that the disclosed apparatus/terminal device and method may be implemented in other manners. For example, the embodiments of the apparatus/terminal device described above are merely illustrative. For example, the division of the modules or units is only a division of the logical functions, and there may be alternative division manner in actual implementation, for example, multiple units or components may be combined or integrated into another system, or some features may be omitted or not implemented. In addition, the mutual coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, that is to say, it may be located in one place, or may be distributed to units of multiple networks. Some or all of the units may be selected according to actual needs to achieve the purpose of the solutions of the embodiments.

Additionally, each functional unit in each embodiment of the present application may be integrated into one processing unit, or each unit may exist physically separately, or two or more units may be integrated into one unit. The above integrated unit may be implemented in the form of hardware or in the form of a software functional unit.

The integrated modules/units, if implemented in the form of software functional units and sold or used as separate products, may be stored in a computer readable storage medium. Based on such understanding, the present application implements all or part of the processes in the foregoing embodiments, and may also be completed by computer programs to instruct related hardware, and the computer programs may be stored in a computer readable storage medium. The steps of the various embodiments of the methods described above may be implemented when the computer programs are executed by the processor. Herein, the computer programs include computer program codes, which may be in the form of source codes, object codes, or some intermediate form of executable files. The computer readable medium may include any entity or device capable of carrying the computer program codes, a recording medium, a USB flash drive, a removable hard disk, a magnetic disk, an optical disk, a computer memory, a read-only memory (ROM), a random access memory (RAM), electrical carrier signals, telecommunication signals, and software distribution media and the like. It should be noted that, the content contained in the computer readable medium may be appropriately increased or decreased according to the requirements of legislation and patent practice in a jurisdiction, for example, in some jurisdictions, according to the legislation and the patent practice, the computer readable media does not include signals pertaining to electrical carrier signals and telecommunication signals.

The embodiments described above are only for explaining the technical solutions of the present application, and are not limited to the present application; although the present application has been described in detail with reference to the foregoing embodiments, those skilled in the art will understand that the technical solutions described in the various embodiments may still be modified, or some of the technical features may be equivalently substituted; and the modifications or substitutions do not make the nature of corresponding technical solutions deviate from the spirit and scope of the technical solutions of the various embodiments of the present application, and should be included in the scope of the present application.

What is claimed is:

1. An anti-counterfeit verification method for glasses, comprising:
   acquiring authentication information input by a user;
   sending the authentication information to a manufacturer server or a dealer server for verification;
   acquiring manufacturer anti-counterfeit information and brand anti-counterfeit information carried by at least one anti-counterfeit tag when a message that the authentication information is validated is received, wherein the at least one anti-counterfeit tag is arranged at the glasses;
   sending the manufacturer anti-counterfeit information and the brand anti-counterfeit information to the manufacturer server for verification; wherein, the manufacturer server is configured to send the brand anti-counterfeit information to the dealer server for verification when the manufacturer anti-counterfeit information is validated;
   determining the glasses to be a genuine one when a message that the manufacturer anti-counterfeit information is validated and a message that the brand anti-counterfeit information is validated are received;
   determining the glasses to be a branded product when only the message that the manufacturer anti-counterfeit information is validated is received; and
   determining the glasses to be a counterfeit when the message that the manufacturer anti- counterfeit information is validated is not received.

2. An anti-counterfeit verification system for glasses, comprising:
   an authentication information acquisition module, configured to acquire authentication information input by a user;
   a first communication module, configured to send the authentication information to a manufacturer server or a dealer server for verification;
   an anti-counterfeit information acquisition module, configured to acquire manufacturer anti-counterfeit information and brand anti-counterfeit information carried by at least one anti-counterfeit tag when a message that the authentication information is validated is received, herein the at least one anti-counterfeit tag is arranged at the glasses;
   a second communication module, configured to send the manufacturer anti-counterfeit information and the brand anti-counterfeit information to the manufacturer server for verification; wherein, the manufacturer server is configured to send the brand anti-counterfeit information to the dealer server for verification when the manufacturer anti-counterfeit information is validated;
   a first determination module, configured to determine the glasses to be a genuine one when a message that the manufacturer anti-counterfeit information is validated and a message that the brand anti-counterfeit information is validated are received;
   a second determination module, configured to determine the glasses to be a branded product when only the message that the manufacturer anti-counterfeit information is validated is received; and
   a third determination module, configured to determine the glasses to be a counterfeit when the message that the manufacturer anti-counterfeit information is validated is not received.

* * * * *